Dec. 5, 1967          C. S. GOLDSTEIN          3,356,917
DYNAMIC CAPACITOR HAVING A PERIPHERALLY DRIVEN ELEMENT
AND SYSTEM INCORPORATING THE SAME
Filed July 16, 1965
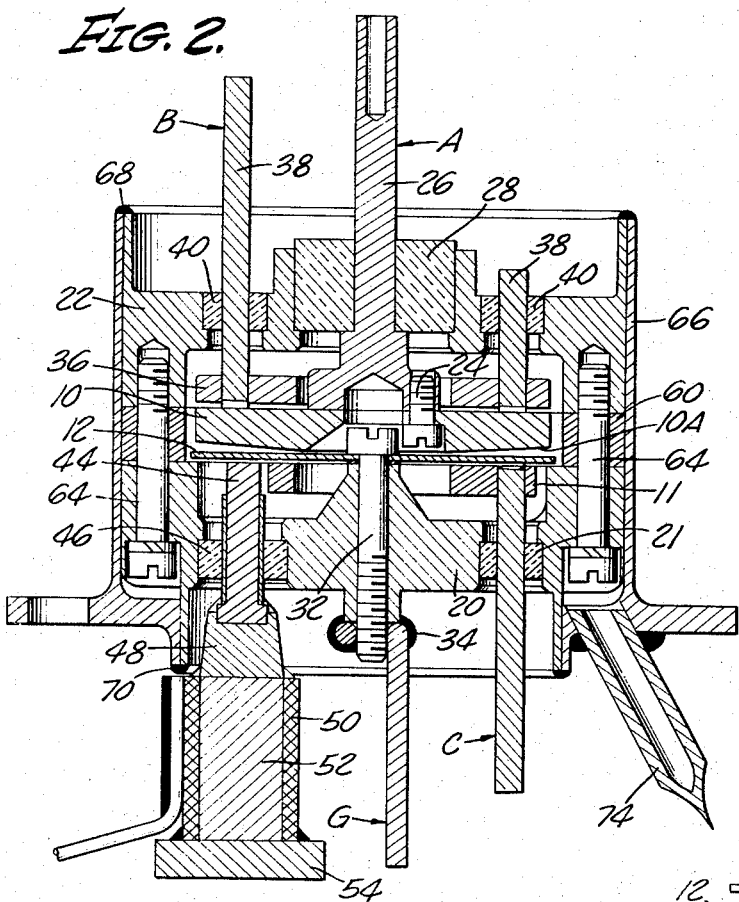
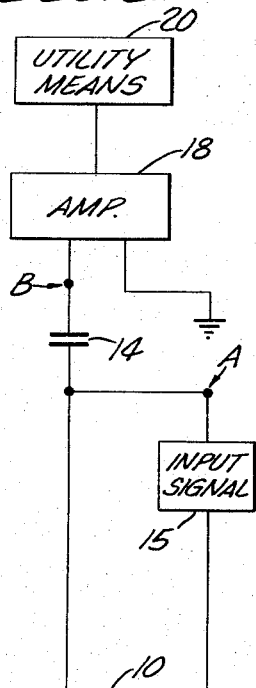
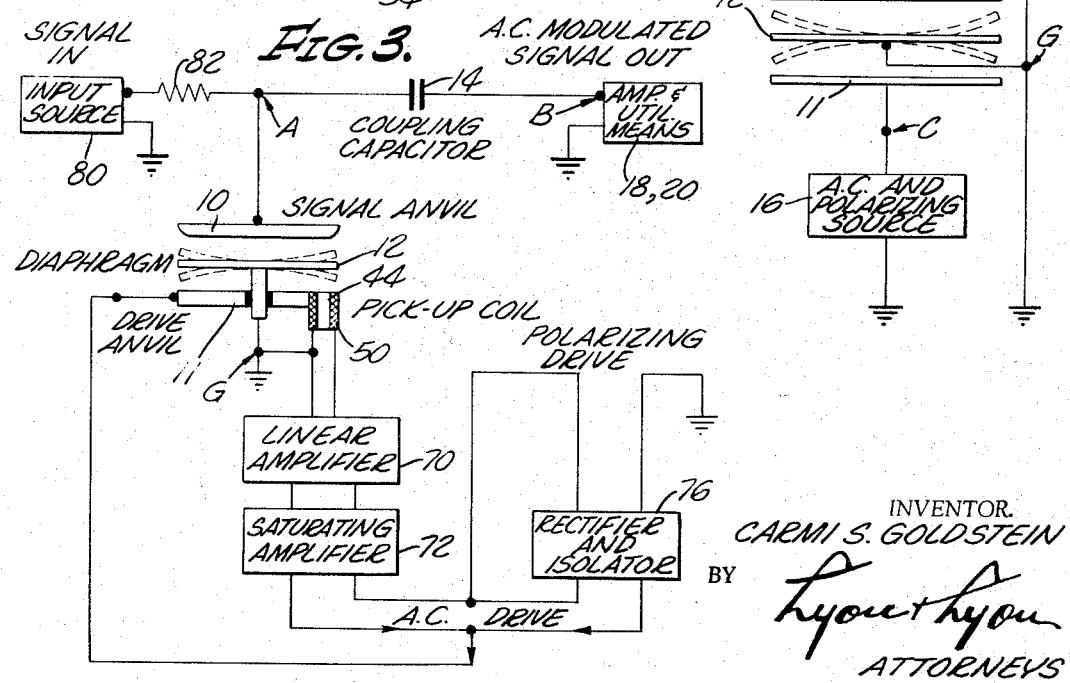
INVENTOR.
CARMI S. GOLDSTEIN
BY
*Lyon + Lyon*
ATTORNEYS

United States Patent Office 3,356,917
Patented Dec. 5, 1967

---

3,356,917
DYNAMIC CAPACITOR HAVING A PERIPHERAL-LY DRIVEN ELEMENT AND SYSTEM INCORPORATING THE SAME
Carmi S. Goldstein, Los Angeles, Calif., assignor to Kinelogic Corporation, a corporation of California
Filed July 16, 1965, Ser. No. 472,643
10 Claims. (Cl. 317—245)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to a capacitor in which one plate or electrode element thereof is vibratable to achieve a variation in capacitance.

Briefly, as disclosed herein, the capacitor includes two spaced stationary elements each generally in the form of a ring having their planes extending generally parallel and a third element in the form of a disc between the two stationary elements, this third element being supported at its center and being in the form of a thin diaphragm which is vibrated at its inherent mechanical resonant frequency to achieve a corresponding variation in capacitance between one of the stationary elements and the vibrating diaphragm.

It is therefore a general object of the present invention to provide a novel capacitor construction having the above indicated features.

A specific object of the present invention is to provide a novel capacitor construction which includes a capacitance determining element vibrated at its mechanical resonant frequency to achieve a corresponding variation in capacitance.

Another specific object of the present invention is to provide a novel capacitor construction of this character featured by its assembly which results in it being simple, efficient with low power consumption, compact, rugged and stable under varying temperature conditions with respect to both conversion efficiency and frequency stability.

Another specific object of the present invention is to provide a capacitor of this character in which the diaphragm vibrates at a relatively high frequency in, for example, the region of 4000 to 5000 cycles per second.

Another specific object of the present invention is to provide a capacitor which is particularly useful in producing a modulation in electrometer type circuits wherein small D.C. currents in the order of $10^{-11}$ to $10^{-15}$ amperes are to be accurately measured and thus may, for example, be used in analytical and control devices such as gas chromatographs, pH (acidity and alkalinity) measurements and radiation measuring devices.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIG. 1 illustrates in schematic form a dynamic capacitor and circuit connections thereto in accordance with features of the present invention.

FIG. 2 is generally a sectional view through a dynamic capacitor embodying the present invention.

FIG. 3 illustrates a system using the capacitor shown in FIG. 2.

The dynamic capacitor, as represented in FIG. 1, includes a pair of stationary capacitor plates or electrodes 10, 11 (referred to later as anvils) between which a third flexible plate or electrode in the form of a center supported diaphragm 12 is disposed, the plate 12 being illustrated as being grounded and the other electrodes 10, 11 being connected to terminals A and C, respectively. A coupling capacitor 14 is connected between plate 10 and terminal B.

In use of the dynamic capacitor, a small voltage from input signal source 15 may be applied to terminal A, and an A.C. drive voltage having a frequency commensurate with the mechanical resonant frequency of the diaphragm 12 in series with a D.C. polarizing voltage may be applied from source 16 to terminal C. The resulting mechanical vibration of the membrane illustrated by dotted lines in FIG. 1 causes the input signal voltage to be amplitude modulated at the vibrational frequency of diaphragm 12. This variation in input signal is applied through coupling capacitor 14 to, for example, the input circuit of an A.C. electrometer amplifier 18 having its output circuit coupling to a utilization means 20.

Referring now to the detailed construction of the dynamic capacitor shown in FIG. 2 wherein elements of the capacitor are within a vacuum-sealed housing, the electrode, plate or anvil 11 is generally in the form of a ring of stainless steel which is stationarily and insulatedly supported on a lower generally cup-shaped housing member 20 using three equally circumferentially spaced supporting pins, one of which (typical of the other two) sealingly extends through an insulating bead 21, and in this case, prolonged to provide the terminal C.

The electrode, plate or anvil 10, generally in the form of a centrally apertured disc of stainless steel, is stationarily mounted on an upper generally cup-shaped housing member 22 using a plurality of screws 24 which secure anvil 10 to the lower flanged end of a center support pin 26, the pin 26 extending sealingly through insulating bead 28 and being prolonged to provide the terminal A.

The plate, electrode, diaphragm or membrane 12 in the form of a thin flexible disc of a material known as Ni Span C is centrally apertured for securing the central portion thereof to the lower housing member 20, using a clamping screw 32 which is threaded in member 20, the screw 32 being prolonged and having the terminal or wire lead G secured thereto as, for example, by a weld or soldering material 34 which has the additional functions of providing a seal at the lower end of screw 32 and grounding the lead G to the housing.

A coupling plate, electrode or anvil 36 also, like anvil 11, is generally in the form of a ring of stainless steel and is stationarily secured in like manner using, in this case, four equally circumferentially spaced supporting pins 38, two of which are shown sealingly extending through insulating beads 40 in housing member 22, with one of such pins 38 being prolonged to provide the terminal B.

A magnet 44 in the form of a cylinder sealingly extends through an insulating bead 46 in housing 20, with its upper end spaced from membrane 12 and with its lower end mounting a base member 48 of stainless steel to which a coil 50 is secured using for the latter purpose a stainless steel support which includes a core 52 within the coil and a retaining disc or cover member 54, the elements 48, 52 and 54 being secured as, for example, by an epoxy cement.

The two cup-shaped housing members 20, 22, each of stainless steel, are secured together with a stainless steel spacing washer interposed therebetween, using six equally circumferentially spaced screws 64 each threaded in the upper housing member 22.

The assembly described above is sealingly enclosed within a thin wall stainless steel shield 66 which has its upper and lower cylindrical ends welded at 68 and 70 to adjacent circumferential ends of housing members 22 and 20, respectively, to thereby provide a good electrostatic shield for the capacitor elements as well as to provide a sealed chamber for the same which chamber is evacuated using an evacuation tube 74 extending from shield 66, this tube 74 having its lower end sealed off, as shown, after the chamber has been evacuated.

It will be seen from the foregoing description of FIG. 2 that the capacitor illustrated at 14 in FIG. 1 is defined by the spaced anvils 10 and 36, and thus all of the elements of the individual capacitors shown in FIG. 1 are included in the evacuated housing in FIG. 2.

The diaphragm 12, in a typical example, may have a thickness of from 10 to 15 mils (.010" to .015") and a diameter in the range of one-half to three quarters of an inch (½" to ¾") with a resulting mechanical resonant frequency of from 4000 to 5000 cycles per second.

The forces which set the membrane or diaphragm into vibration are electrostatic in nature. Using a spacing between drive anvil 11 and diaphragm 12 of from one to two mils (.001" to .002"), voltages of less than 100 volts A.C. applied between grounded terminal G and terminal C produce conversion efficiencies at the signal anvil 10, of ten percent or more. It will be observed in FIG. 2 that the signal anvil 10 is shaped with a spherical tapered face 10A adjacent to the membrane 12, with the taper on such face extending generally radially outwardly from the plane of the diaphragm so that there is progressively a larger spacing between elements 10 and 12, with the spacing being largest at the circumferential portion of anvil 10. This particular taper on anvil 10 results in better output voltage waveform than would otherwise be the case when the adjacent faces of elements 10, 11 extend in parallel planes.

The structure involving the permanent magnet 44 and coil 50 may be used to provide a signal for a drive oscillator in a positive feedback network as now described in connection with FIG. 3.

FIG. 3 illustrates one of the many uses for the dynamic capacitor. The linear amplifier 70 has its input circuit coupled to the pickup coil 50 and its output circuit coupled to a saturating amplifier 72 which is essentially a free running multivibrator "tuned" to run at a rate less than the mechanical resonant frequency of membrane 12. An output voltage from the amplifier 72 is applied to terminal C to provide the drive for the diaphragm 12, the diaphragm being driven by the electrostatic forces developed between it and the drive anvil 11, it being noted that whenever a two plate capacitor has a voltage applied between the two plates, one of the plates is charged negatively and the other is charged positively, and thus a force of attraction between the plates is developed. In this instance, the flexible plate or diaphragm 12 has an inherent mechanical resonant frequency the same as the frequency of the A.C. signal applied to terminal C, and thus vibration of the diaphragm is sustained since a drive force is applied in timed relationship to excursions of the peripheral portion of the diaphragm. Vibration of the diaphragm 12 is about a mean point established by the magnitude of a polarizing voltage applied to anvil 12.

The A.C. drive voltage and D.C. polarizing voltage may, for example, be 80 and 150 volts, respectively.

Thus, when the saturating amplifier 72 is energized, the diaphragm starts and continues to vibrate and such vibrations result in a change in magnetic flux in the polarized magnetic circuit which includes the permanent magnet 44 and the core 52 of coil 50. The change in flux induces a voltage in coil 50 which is applied to amplifier 70 in a positive feedback sense to sustain oscillations of the diaphragm 12. The gain and phase conditions in this feedback circuit may be controlled using conventional means.

A rectifier and isolator means 76 is coupled to amplifier 72 and supplies a polarized voltage to anvil 11 so that both a D.C. voltage as well as an A.C. voltage is applied to anvil 11.

It will be appreciated that various means may be used to apply both a polarizing and an A.C. drive voltage to the drive anvil 11.

The input signal whose value is to be determined or is to be used for indication or control or other purposes is illustrated as being developed in an input source 80 having one of its terminals grounded and the other one of its terminals connected via resistance 82 to terminal A. The vibrations of the diaphragm 12 cause correspondingly timed changes in the particular capacitor defined by signal anvil 10 and vibrating diaphragm 12, with such capacitor being charged in greater amount the smaller the spacing between these two elements. Consequently, as a result of a changing charging current flowing through resistance 82, there is a corresponding variation in voltage at terminal A; and this variation in voltage in the form of an amplitude modulation is applied through coupling capacitor 14 (defined by anvils 10 and 36 in FIG. 2) to the terminal B connected to the amplifier and utilization means 18, 20.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A dynamic capacitor comprising a first stationary element, a second stationary element, a third element in the form of a diaphragm between said first and second elements, said third element being in the form of a flexible metallic disk stationarily supported at its center means cooperating with the peripheral portion of said disk and vibrating such peripheral portion at its inherent mechanical resonant frequency to achieve a corresponding variation in capacitance between one of said stationary elements and the vibrating diaphragm.

2. A capacitor as set forth in claim 1 in which said first and second elements are each in the form of a ring.

3. A capacitor as set forth in claim 1 in which said elements are mounted in an evacuated chamber.

4. A capacitor as set forth in claim 1 in which said third element vibrates at a frequency of 4000 to 5000 cycles per second.

5. A capacitor as set forth in claim 1 in which said third element is at ground potential.

6. A system embodying a capacitor as set forth in claim 1 including an input signal source connected to one of said elements, an AC voltage source having a frequency commensurate with the mechanical resonant frequency of said third element connected to said second element to drive the peripheral portion of said third element.

7. A system as set forth in claim 6 including utilization means coupled to one of said elements.

8. A system as set forth in claim 6 including a pickup coil coupled to said third element, and utilization means coupled to said coil.

9. A capacitor as set forth in claim 3 in which said chamber is defined by a metal structure that provides an electrostatic shield.

10. A system as set forth in claim 6 including means polarizing said third element.

References Cited

UNITED STATES PATENTS 1,718,494  6/1929  Schurig _____ 317—246 X
1,952,924  3/1934  Koch.

FOREIGN PATENTS 935,210  8/1963  Great Britain.

OTHER REFERENCES

German printed application 1,158,634, Monser.

LEWIS H. MYERS, *Primary Examiner.*

G. GOLDBERG, *Assistant Examiner.*